US012718387B2

(12) United States Patent
Ramachandran et al.

(10) Patent No.: US 12,718,387 B2
(45) Date of Patent: Aug. 25, 2026

(54) METHOD AND ELECTRONIC DEVICE FOR DETERMINING DEPTH INFORMATION OF OBJECTS IN A SCENE

(71) Applicant: SAMSUNG ELECTRONICS CO., LTD., Suwon-si (KR)

(72) Inventors: Akshat Ramachandran, Bengaluru (IN); Ankit Dhiman, Bengaluru (IN); Basavaraja Shanthappa Vandrotti, Bengaluru (IN); Jooyoung Kim, Suwon-si (KR); Lokesh Rayasandra Boregowda, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 18/739,877

(22) Filed: Jun. 11, 2024

(65) Prior Publication Data

US 2024/0331176 A1 Oct. 3, 2024

Related U.S. Application Data

(63) Continuation of application No. PCT/IB2024/051146, filed on Feb. 8, 2024.

(30) Foreign Application Priority Data

Feb. 10, 2023 (IN) ............................ 202341008769
Feb. 2, 2024 (IN) ............................ 202341008769

(51) Int. Cl.
*G06V 10/25* (2022.01)
*G06T 5/50* (2006.01)
(Continued)

(52) U.S. Cl.
CPC .................. *G06T 7/50* (2017.01); *G06T 5/50* (2013.01); *G06V 10/141* (2022.01); *G06V 10/25* (2022.01);
(Continued)

(58) Field of Classification Search
None
See application file for complete search history.

(56) References Cited

U.S. PATENT DOCUMENTS 10,462,446 B2 10/2019 Varekamp et al.
10,515,463 B2 12/2019 Takeda et al.
(Continued)

FOREIGN PATENT DOCUMENTS

CN 109447923 A 3/2019
CN 112001914 A 11/2020
(Continued)

OTHER PUBLICATIONS

International Search Report (PCT/ISA/210) and Written Opinion (PCT/ISA/237) issued by the International Searching Authority on Jun. 10, 2024 in corresponding International Application No. PCT/IB2024/051146.

(Continued)

*Primary Examiner* — Idowu O Osifade
(74) *Attorney, Agent, or Firm* — Sughrue Mion, PLLC

(57) ABSTRACT

A method for determining depth information of objects in a scene, includes: generating RGB images having a first pixel density using an RGB camera; generating a depth image having a second pixel density using a depth camera, the second pixel density being lower than the first pixel density; generating an attention map using the RGB images with a high pixel density; merging the RGB images and the depth image to generate a merged image; determining an uncertainty score of each pixel of a plurality of pixels in the merged image; determining a threshold for the uncertainty score based on a level of uncertainty in the plurality of pixels; determining a depth value for each pixel of the plurality of pixels exceeding the threshold of the uncertainty score; applying the depth value of each pixel of the plurality
(Continued)

of pixels in the merged image; and generating the scene with the depth information based on the depth value.

14 Claims, 16 Drawing Sheets

(51) Int. Cl.
*G06T 7/50* (2017.01)
*G06V 10/141* (2022.01)

(52) U.S. Cl.
CPC ............... *G06T 2207/10024* (2013.01); *G06T 2207/20221* (2013.01)

(56) References Cited

U.S. PATENT DOCUMENTS

2021/0134002 A1 5/2021 Yao et al.
2021/0150747 A1* 5/2021 Liu ...................... G06N 3/0455
2021/0350560 A1 11/2021 Laidlow et al.
2022/0067950 A1 3/2022 Lv et al.
2022/0148202 A1 5/2022 Guizilini et al.
2022/0343525 A1 10/2022 Garg et al.
2023/0035477 A1 2/2023 Gu et al.

FOREIGN PATENT DOCUMENTS

CN 112102386 A 12/2020
CN 114445475 A 5/2022
CN 112861729 B 7/2022
KR 10-2269750 B1 6/2021
KR 10-2022-0029335 A 3/2022

OTHER PUBLICATIONS

Communication dated Oct. 17, 2025, issued by Intellectual Property India in Indian Patent Application No. 202341008769.
Communication dated May 7, 2026 issued by Intellectual Property India in Indian Patent Application No. 202341008769.

* cited by examiner (b) Schematic Diagram of UWB Radar Data Acquisition

Figure 11:
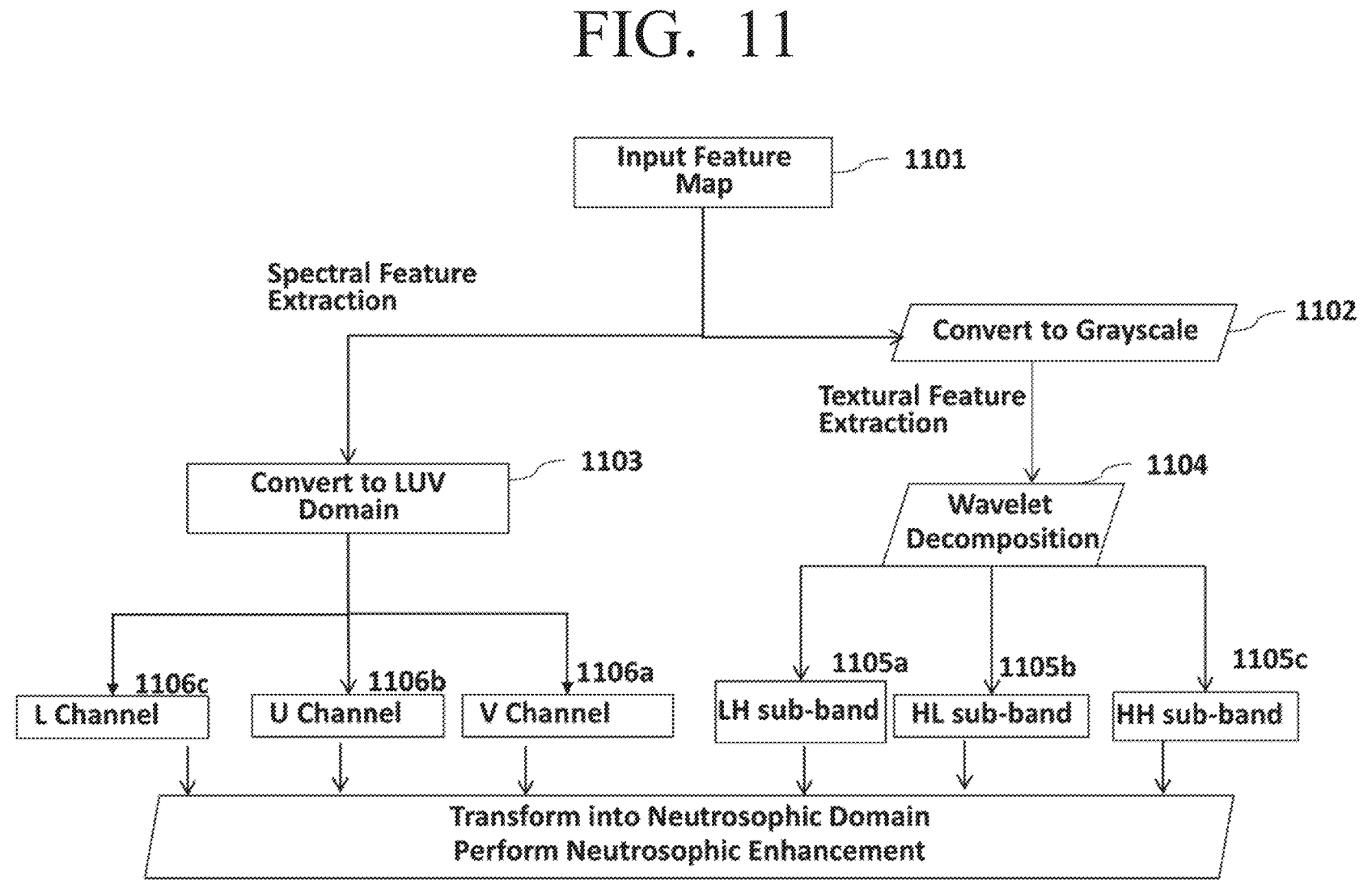

Input Feature Map 1101

Convert to Grayscale 1102

Textural Feature Extraction

Wavelet Decomposition 1104

LH sub-band 1105a

HL sub-band 1105b

HH sub-band 1105c

Spectral Feature Extraction

Convert to LUV Domain 1103

V Channel 1106a

U Channel 1106b

L Channel 1106c

Transform into Neutrosophic Domain
Perform Neutrosophic Enhancement

METHOD AND ELECTRONIC DEVICE FOR DETERMINING DEPTH INFORMATION OF OBJECTS IN A SCENE

CROSS-REFERENCE TO RELATED APPLICATIONS

This application is a bypass continuation of an International application No. PCT/IB2024/051146, filed on Feb. 8, 2024, which is based on and claims priority to Indian Provisional Patent Application No. 202341008769, filed on Feb. 10, 2023, in the Indian Intellectual Property Office, and Indian Complete patent application Ser. No. 202341008769, filed on Feb. 2, 2024, in the Indian Intellectual Property Office, the disclosures of which are incorporated by reference herein in their entireties.

BACKGROUND

1. Field

The present disclosure relates to determining depth information in objects in a scene.

2. Description of Related Art

In recent times, depth sensors have become increasingly popular for their ability to provide reliable three-dimensional spatial data for various applications, including augmented reality/virtual reality (AR/VR) and autonomous vehicles. However, these sensors face certain limitations, such as the inability to detect transparent objects and restricted distance range, resulting in a wide range of absent depth values. Incomplete depth maps can impede downstream vision tasks, and the emergence of low-power depth sensors designed to capture selective depth points, in response to the growing use of AR devices, has further diversified the sensor landscape. This diversity can potentially cause a model trained for a specific sensor configuration to fail when presented with input from a different sensor.

Many depth completion techniques predominantly rely on convolutional neural networks that leverage sparse depth data. Typically, these methods employ a network comprising multiple convolutional layers or a basic autoencoder to forecast and approximate the dense depth map. Nevertheless, recent studies have demonstrated that incorporating multi-modal information techniques, such as color images, has yielded remarkable outcomes. Depth completion frameworks have extended beyond using multiple branches for feature extraction from multimodal data to encompass additional components, including surface normal information, affinity matrices, residual depth maps, adversarial regularization, among others, with the goal of enhancing the potential of depth completion methods.

The depth completion maps captured by different sensors is complex due to marked differences in their outputs. Fundamentally, convolutional neural network (CNN)-based methods are limited by their static nature and inability to adapt to diverse spatial contexts. While some depth estimation methods have shown remarkable performance in completing uniformly sampled sparse depth maps from a single sensor configuration, this does not reflect real-world scenarios with large missing regions and semantic missing patterns. Given the dynamic nature of indoor depth and varying sensor-dependent data distributions, a completion network must accurately model the indeterminacy in depth maps to generalize to the multitude of possibilities of noise and artifacts present in indoor depth. As such, utilizing different sensors to achieve complete and accurate depth maps presents significant challenges.

SUMMARY

According to an aspect of the disclosure, a method for determining depth information of objects in a scene, includes: generating RGB images having a first pixel density using an RGB camera; generating a depth image having a second pixel density using a depth camera, the second pixel density being lower than the first pixel density; generating an attention map using the RGB images with a high pixel density; merging the RGB images and the depth image to generate a merged image; determining an uncertainty score of each pixel of a plurality of pixels in the merged image; determining a threshold for the uncertainty score based on a level of uncertainty in the plurality of pixels; determining a depth value for each pixel of the plurality of pixels exceeding the threshold of the uncertainty score; applying the depth value of each pixel of the plurality of pixels in the merged image; and generating the scene with the depth information based on the depth value.

The attention map may include semantically related pixels of the RGB images.

The generating the depth image may include: illuminating the scene with a modulated light source using the RGB camera; capturing a reflected light on a sensor associated with the depth camera at different phases with respect to the illuminated scene; determining a phase shift between the illuminated scene and the reflected light at the different phases; and collocating the illuminated scene with the reflected light on the sensor to generate the depth image.

The determining the threshold for the uncertainty score may include: determining each pixel value of the RGB images based on uncertainty; assigning weights to each pixel of the plurality of pixels based on the level of the uncertainty; and determining the level of the uncertainty in the plurality of pixels based on the assigned weights.

The generating the attention map may include determining a region of interest having poor depth values.

The determining the depth value for each pixel exceeding the threshold of the uncertainty score may include: determining a unified ordinal vector (UOV) to each pixel of the scene, wherein the UOV identifies missing depth pixel value through classification scene semantics; and applying a regression method on the determined UOV to determine the depth value.

The determining the uncertainty score of each pixel of the plurality of pixels is based on Neutrosophic sets.

According to an aspect of the disclosure, an electronic device for determining depth information of objects in a scene, includes: a memory storing instructions; an RGB camera; a depth camera; at least one processor operatively coupled with the memory, the RGB camera and the depth camera, wherein the least one processor is configured to execute the instructions to: generate RGB images having a first pixel density using the RGB camera; generate a depth image having a second pixel density using the depth camera, the second pixel density being lower than the first pixel density; generate an attention map using the RGB images with a high pixel density; merge the RGB images and the depth image to generate a merged image; determine an uncertainty score of each pixel of a plurality of pixels in the merged image; determine a threshold for the uncertainty score based on a level of uncertainty in the plurality of pixels; determine a depth value for each pixel of the plurality of pixels exceeding the threshold of the uncertainty score; apply the depth value for each pixel of the plurality of pixels in the merged image; and generate the scene with the depth information based on the depth value.

The attention map may include semantically related pixels of the RGB images.

The at least one processor may be further configured to execute the instructions to generate the depth image having the second pixel density by: illuminating the scene with a modulated light source using the RGB camera; capturing a reflected light on a sensor associated with the depth camera at different phases with respect to the illuminated scene; determining a phase shift between the illuminated scene and the reflected light at the different phases; and collocate the illuminated scene with the reflected light on the sensor to generate the depth image.

The at least one processor may be further configured to execute the instructions to determine the threshold for the uncertainty score by: determining each pixel value of the RGB images based on uncertainty; assigning weights to each pixel of the plurality of pixels based on the level of the uncertainty; and determining the level of the uncertainty in the plurality of pixels based on the assigned weights.

The at least one processor may be further configured to execute the instructions to generate the attention map by determining a region of interest having poor depth values.

The at least one processor may be further configured to execute the instructions to determine the depth value for each pixel of the plurality of pixels exceeding the threshold of the uncertainty score by: determining a unified ordinal vector (UOV) to each pixels of the scene, wherein the UOV identifies missing depth pixel value through classification scene semantics; and applying a regression method on the determined UOV to determine the depth value.

The at least one processor may be further configured to execute the instructions to determine the uncertainty score of each pixel of the plurality of pixels based on a Neutrosophic sets.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is an architecture illustrating NeutroTR transformer, according to one or more embodiments;

FIG. 11 is a flow diagram illustrating Neutrosophic framework flow, according to one or more embodiments;

DETAILED DESCRIPTION

Figure 1A:
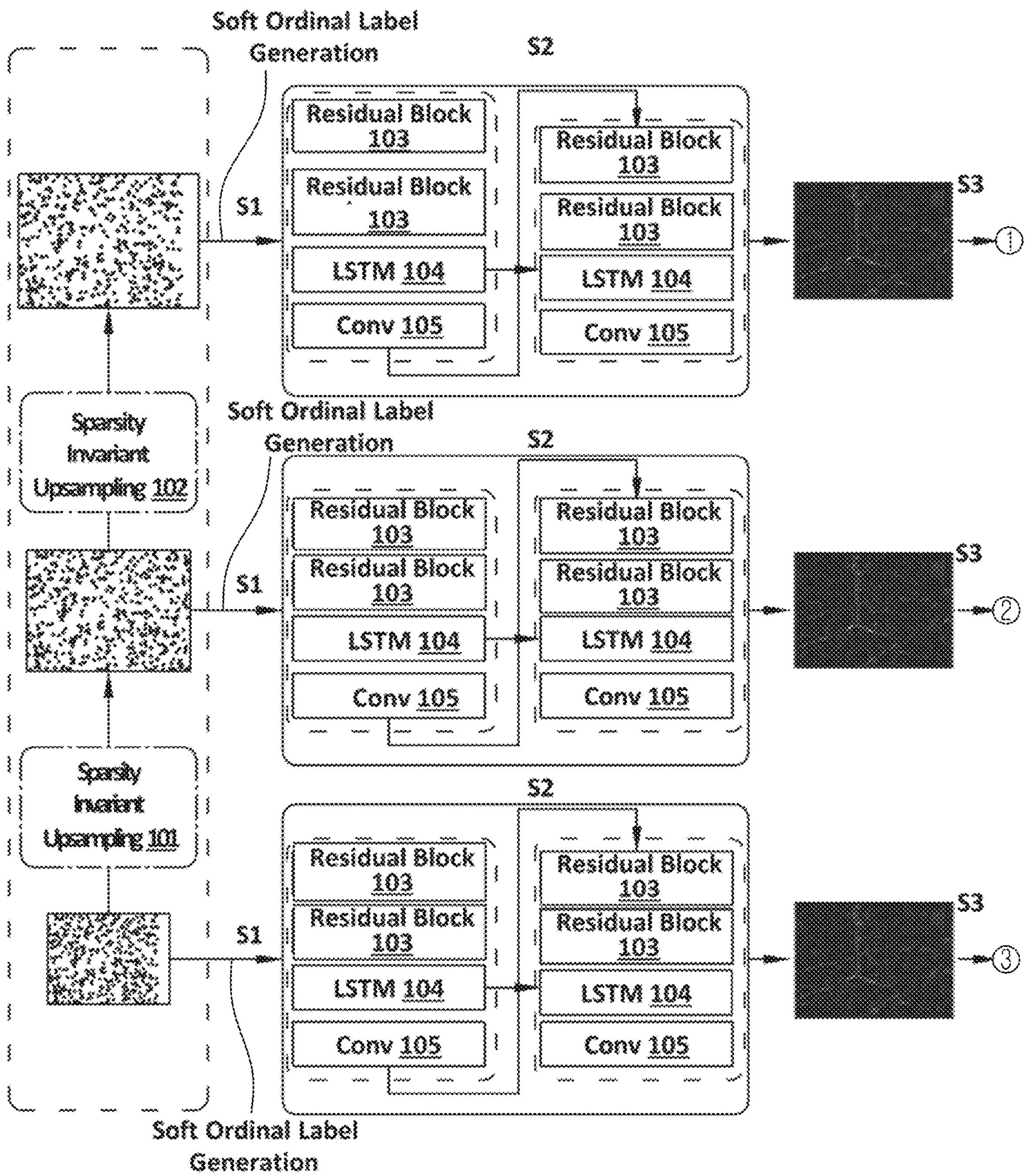
FIG. 1A is a schematic diagram illustrating the process which is governed by the principles of uncertainty quantification and Neutrosophic set guided attention, and is carried out using sparse sensors, according to one or more embodiments.

Example embodiments of the disclosure and the various features and advantageous details thereof will be explained more fully with reference to the accompanying drawings. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The disclosure provides an advanced multi-scale framework that can extract complementary and hierarchical feature representations from the indeterminate nature of neutrosophic (NS) modalities. It efficiently captures inter- and intra-modal dependencies through a central dual-encoder and decoder transformer (106, 107) that is guided to adapt to various spatial contexts in input depth. Moreover, the method combines the strengths of both regression and classification techniques to achieve exceptional and sensor-agnostic depth completion.

Related art methods pertain to techniques for ascertaining the depths of a scene from a monocular image. To this end, depth features are derived from depth data using a Sparse Auxiliary Network (SAN) that involves sparsifying the depth data, applying sparse residual blocks of the SAN to the depth data, and densifying the depth features. The depth features are then employed to generate a depth map and a monocular image that correspond to the depth data, as per a depth model that incorporates the SAN. Additionally, the method entails furnishing the depth map as a depth estimator of objects depicted in the monocular image. In contrast to the related art method, the method according to one or more embodiments handles different depth sensor data from a single network and utilizes a framework with uncertainty handling and neutrosophic features.

The existing methods rely on a combined input of the monocular image and sparse depth data to determine the scene's depth. However, these methods are limited to Light Detection and Ranging (LiDAR) type sensors for outdoor settings. Furthermore, the existing methods do not disclose the ability to accommodate different sensor configurations in the same network or different ambient conditions. Additionally, the existing methods fail to disclose a framework with uncertainty handling and neutroscopic features, as well as the ability to handle different depth sensor data from a single network.

In a related art method, a real-time depth completion technique that employs pseudo-depth map guidance is utilized. Specifically, RGB images are captured using an RGB camera while a sparse depth image is obtained through laser radar detection. The sparse depth map is subjected to morphological operations, resulting in the generation of a pseudo depth map. This approach significantly enhances the accuracy of depth completion, corrects errors in sparse depth maps, and provides structural similarity supervision. Also, related art methods include performing morphological operation data processing on the sparse depth map, as well as multi-core multi-scale expansion and median filtering, to achieve sparse depth map densification and generate a pseudo depth map. In contrast to the related art methods, the method according to one or more embodiments of the disclosure takes into account uncertainty in lower layers to aid depth completion in subsequent layers, thereby ensuring more robust depth completion.

Figure 1B:
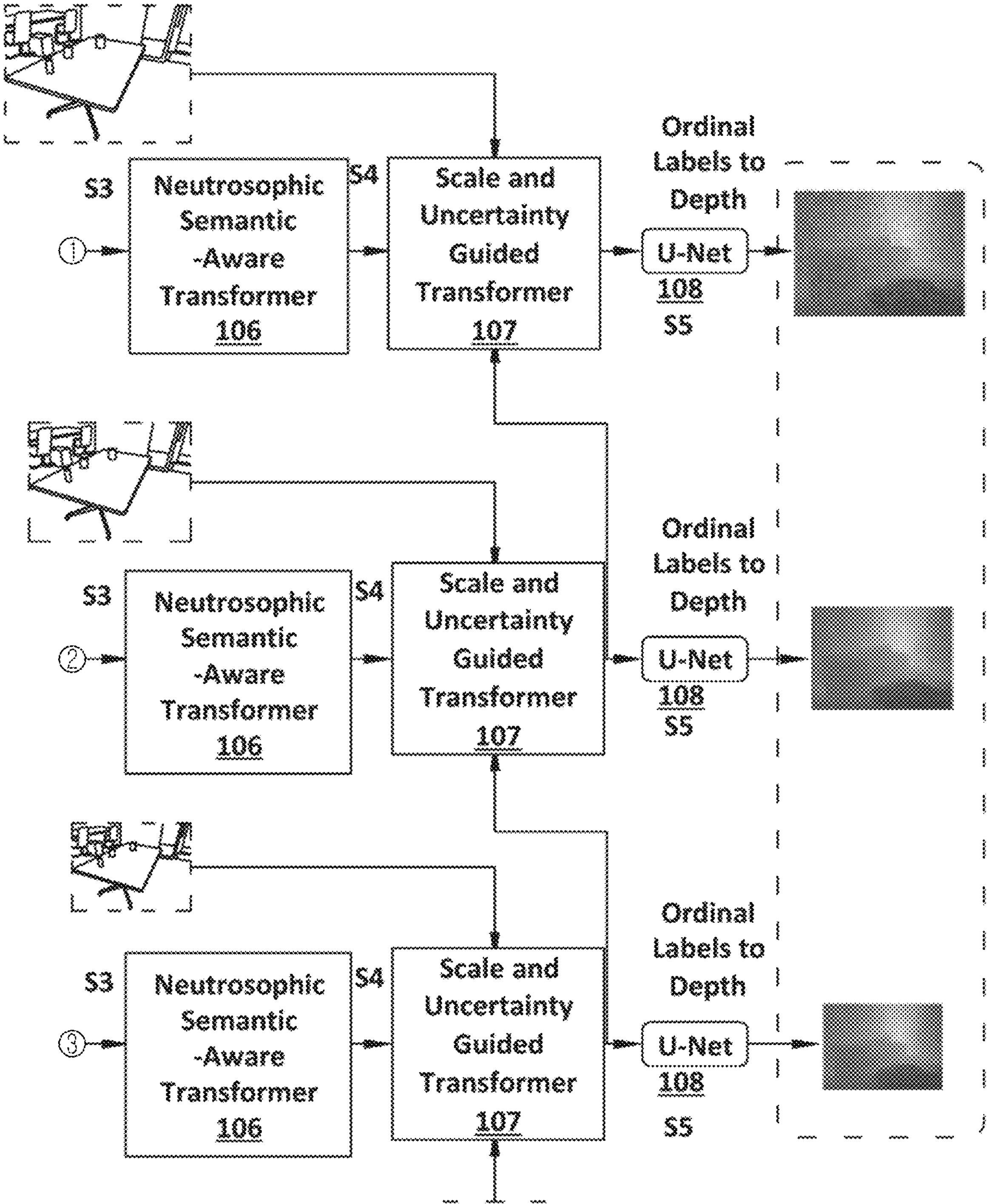
FIG. 1B is a schematic diagram illustrating the process which is governed by the principles of uncertainty quantification and Neutrosophic set guided attention, and is carried out using sparse sensors, according to one or more embodiments.

Accordingly, embodiments of the disclosure provide a method and an electronic device for determining depth information of objects in a scene. The method includes generating an RGB images having a first high pixel density using an RGB camera and generating a depth image having a second pixel density lower than the first high pixel density using a depth camera. An attention map is generated using high pixel density RGB images and the RGB images and the depth image are merged to generate from the RGB camera and the depth camera. Further, the method determines an uncertainty score of each pixel of the plurality of pixels in the merged RGB images and the depth image and determine a threshold for the uncertainty score based on a level of uncertainty in the plurality of pixels. Furthermore, the method applies the determined depth value of the plurality of pixels in the merged image and generating the scene with the depth information based on the determined depth value. FIGS. 1A and 1B are schematic diagrams illustrating completion process which is governed by uncertainty quantification and Neutrosophic set guided attention from sparse sensors, according to one or more embodiments.

A depth correction method for a scene in electronic devices having a depth camera and a plurality of RGB camera is described. An RGB image is generated having a first higher pixel density using the RGB camera. A depth image having a second pixel density substantially lower than the first pixel density is generated using the depth camera. An attention map of the RGB images is generated, the attention map including semantically related pixels of the AR scene and merging the RGB images and the depth image. An uncertainty score is calculated for the pixels in the merged image. A depth value is determined for each pixel having a pre-defined higher uncertainty score, by referring to a semantically related pixel in the attention map. The depth value is determined by applying in the merged image for the pixels having higher uncertainty score.

Embodiments of the present disclosure employ different sensors for different applications and utilize a single deep learning model which by virtue of quantifying the uncertainty in the input and distribution can generalize to the multitudinous possibilities of noise and artefacts in depth. For instance, depth sensors for indoor and outdoor use cases can be employed in a scanning device in existing methods, but using the method according to one or more embodiments alone, superior dense depth estimation is achieved using a depth estimator (1305) without any modifications.

The embodiments of the present disclosure provide an innovative solution to generalize and accurately estimate depth maps captured by various sensors, despite extreme variability in noise and data patterns. This is achieved through the incorporation of uncertainty quantification and Neutrosophic set guided attention. The deep model is designed to work seamlessly for both indoor and outdoor environments, by leveraging different types of sensors. The depth estimation results showcase varying sparsity patterns and sample counts, with accuracy levels as high as 5% of the complete spatial resolution of the image. Moreover, the technology supports VR/MR head-mounted devices that require reduced power due to spot depth sensors, with a wide range (both indoor and outdoor), this technology enables seamless 3D scene understanding under any ambient condition.

In an embodiment, dense depth cues are used in a wide range of applications such as AR, 3D reconstruction and robotics and the like, to provide a reliable 3D spatial information of the scene. The dense depth cues characterize distance between the electronic device and points in real environment as the depth map corresponding to the pixels in the scene. However, due to inherent limitations in several depth sensors (for example, Kinect, RealSense), the sensors are unable to generate precise and complete depth maps. The sensors instead provide sparse or incomplete (semi-dense) depth maps with holes and artefacts of varying distributions due to transparent, reflective, dark surfaces and more. Therefore, depth completion as a task is employed to generate a dense depth estimation from an input sparse and incomplete depth map for reliable utilization in downstream tasks.

Referring to FIG. 1A, at S1, sparsity invariant upsampling is performed. The sparsity invariant up-sampling enhance resolution or upsample low-resolution depth maps while preserving the sparsity or sparse nature of data. Depth estimation from images often involves generating the depth map that represents the distance of objects in a scene from the camera or sensor. However, the depth maps have lower resolution or details due to various reasons like hardware limitations or the nature of the depth sensing technology used. The sparsity-invariant upsampling methods increase the resolution of the depth maps without significantly altering or losing the sparsity properties of the data. Sparsity, in this context, refers to the characteristic where depth maps often contain a significant number of zero or sparse values, especially in regions with uniform surfaces or where depth information is not available.

At S2, soft ordinal label generation is performed. A Dense Ordinal Depth Estimation Module (DODEM), consists of two strided convolutional blocks to downsample feature map to get more sparse abstract features. Then, four dilated convolution layers 105 with dilation rates of 2, 4, 8, 16 are used to increase the convolutional receptive field. Finally, two deconvolution layers are used to increase size to the original resolution and the output is obtained by two convolution layers 105 with sigmoid activation and channels equal to the number of ordinal labels. Skip connections are incorporated between the encoder and decoder to reduce information loss.

Many depth completion techniques, mostly based on convolutional neural networks S2, leverage only the sparse depth using a network of several convolutions 105 or a simple auto encoder to estimate the dense depth map. However, by utilizing multi-modal information in the form of color images. In addition to multiple branches used for feature extraction from multimodal data, for example, color and sparse depth are integrated with surface normal, affinity matrix, residual depth map using a residual block 103, adversarial regularization and the like, into frameworks to further push the envelope of depth completion. Furthermore, since there is a marked difference between depth maps captured by different sensors, the completion problem is complex and rudimentary CNN-based methods are fundamentally limited by the static nature and the inflexibility to adapt to the diverse and disparate spatial contexts. Therefore, the related art methods using depth completion tend to use complicated network structures and complex learning strategies to make the completion network as sensor independent as possible.

For every incomplete depth map input to the network, sparsity invariant downsampling is used with a factor of 2 to obtain the depth map of different scales as input S1. Similarly, for the color images bilinear downsampling is used. A NTrans-Net being a multi-scale network, takes the incomplete depth (after encoding each pixel as UOVs) and corresponding color image across scales and outputs a dense ordinal depth estimate for each scale input. Considering four levels of downsampled input in the network resulted in the maximal performance gain. In order to extract an initial coarse uncertainty estimate from the sparse input, Res-LSTM components 104 is used. The DUEM is highlighted in FIGS. 1A and 1B, in which, the input from each scale is processed by an LSTM component after 5 residual blocks 103. Four Res-LSTM components are used in NTrans-Net to extract the uncertainty estimate. The LSTM can quickly eliminate redundancy in feature maps while reducing negative effects caused by the disappearance of the gradient.

At S3, although an initial extracted uncertainty representation has important features that can guide the depth completion task, through experimentation, and the decomposed neutrosophic features are used to refine the uncertainty estimate for highlighting crucial regions like dark, reflective surfaces can further improve completion quality. A neutrosophic (NS) is made of three elements namely, Truth (T), False (F) and Indeterminacy (I). In the context of NS, uncertainty is expressed as indeterminacy. The mapping posited to design the NS feature extractor and transform each pixel in the image to the corresponding NS domain. The initial uncertainty map and the corresponding color image at each scale are decomposed into the T and I subsets only. Since the F subset includes redundant information, this feature is skipped in the proposed network. Using the combined T and I feature sets, are able to organically represent pixels with noisy depth or regions where depth is unpredictable as high indeterminacy data in a more detailed and refined manner as compared to the initial uncertainty map.

To thoroughly exploit the hierarchical and complementary information present in the color and depth neutrosophic feature maps, a dual branch transformer encoder-decoder structure (NeutroTR) 106, 107 is utilized. The two encoder branches have an identical structure. The truth and indeterminacy subsets each pass through a shallow feature extractor composed of 3×3 residual blocks with shared weights, which leads to more stable training and better performance. The resulting shallow features are then flattened and the key and value vectors are extracted from the truth subset and the query vector from the indeterminacy subset. Each encoder stage consists of self-attention blocks, feed-forward network and a down-sampling layer. After the encoding stage, a guided attention mechanism is used to fuse features from the two encoders. The neutrosophic depth encoder is considered as the guidance branch (G) and the neutrosophic color encoder as the input (I) to the guidance mechanism as shown equation 2:

$$G_{attn}(Q_I^C, K_G^U, V_G^U) = \text{softmax}\left(\frac{Q_I^C K_G^{U^T}}{\sqrt{d}} + B\right) V_G^U \quad (2)$$

The decoder is symmetric to the encoder with the addition of a scale guidance attention similar to equation (2), to guide the depth completion of the current scale with the upsampled NeutroTR 702 output of the previous scale for complementary and redundant feature representation.

Finally, a deep convolutional encoder-decoder is used to predict the dense depth for each scale (only full-scale depth prediction is taken as network output, other downsampled outputs are used only for multi-scale loss) using the features output from NeutroTR 702. The Dense Ordinal Depth Estimation Module (DODEM), includes two strided convolutional blocks to downsample the feature map to get more sparse abstract features. Then, four dilated convolution layers with dilation rates of 2, 4, 8, 16 are used to increase the convolutional receptive field. Finally, two deconvolution layers are used to increase the size to the original resolution and the output is obtained by two convolution layers with sigmoid activation and channels equal to the number of ordinal labels. Skip connections are incorporated between the encoder and decoder to reduce information loss.

At S4, a dual branch transformer encoder-decoder structure (NeutroTR) 106, 107 is used to determine hierarchical and complementary information present in the color and depth neutrosophic feature map. The two encoder branches have an identical structure. The truth and indeterminacy subsets each pass through a shallow feature extractor composed of 3×3 residual blocks with shared weights, which leads to more stable training and better performance. The resulting shallow features are then flattened and we intuitively extract the key and value vectors from the truth subset and the query vector from the indeterminacy subset. Each encoder stage consists of self-attention blocks, feed-forward network and a down-sampling layer.

At S5, the single-scale U-Net (U-network) 108 is used with structure similar to DODEM. The comparison results are shown in Table. 1, where S, M, Reg, Cla, Base denote single-scale, multiscale, regression, classification and baseline respectively. The default setting for all experiments is (Reg+Cla) using the UOV formulation, unless specified. Specifically, from Table. 1, using DUEM with NeutroTR 702 has a positive effect on the depth completion performance, due to its ability to deliver better contextual information to the main depth completion branch, which cannot be directly learned from color and sparse depth alone. The NTrans-Net with UOVs performs significantly better than using regression or classification.

| Model | MS | DUEM | NTR | $L_1$ | $L_o$ | $L_e$ | RMSE(m) ↓ | REL (m) ↓ |
|---|---|---|---|---|---|---|---|---|
| S_base | | | | ✓ | | | 0.221 | 0.040 |
| M_base | ✓ | | | ✓ | | | 0.196 | 0.028 |
| S_U | | ✓ | | | ✓ | ✓ | 0.165 | 0.019 |
| M_U | ✓ | ✓ | | | ✓ | ✓ | 0.142 | 0.019 |
| w/o $L_o$ | ✓ | ✓ | ✓ | ✓ | | ✓ | 0.125 | 0.017 |
| w/o $L_e$ | ✓ | ✓ | ✓ | | ✓ | | 0.098 | 0.013 |
| Disclosure (reg) | ✓ | ✓ | ✓ | ✓ | | ✓ | 0.103 | 0.013 |
| Disclosure (cla) | ✓ | ✓ | ✓ | | ✓ | ✓ | 0.106 | 0.015 |
| Disclosure | ✓ | ✓ | ✓ | | ✓ | ✓ | 0.091 | 0.012 |

MS: Multi-scale,
NTR: NeutroTR

Figure 2:
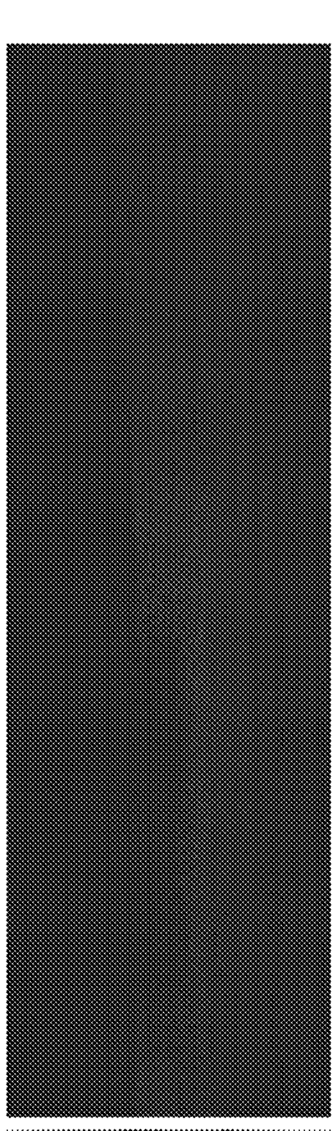
FIG. 2 presents a comparison between the Flood Time of Flight (ToF) and Light Detection and Ranging (LiDAR) techniques, according to the related art.
Figure 2:
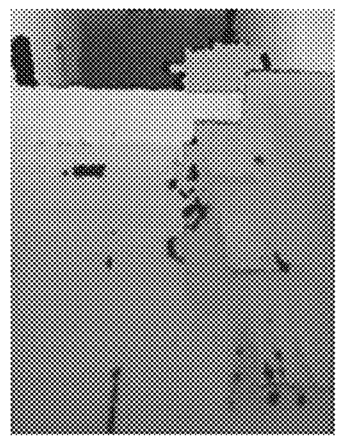

FIG. 2 is a representation comparing Flood Time of Flight (ToF) and the LiDAR, according to the related art. The ToF depth map generation process (Particularly for iToF) includes indirect ToF method for depth calculation to illuminate the MR scene with a modulated light source. The modulation function can be a sine wave, rectangular pulse or a sinusoidal modulation.

The sensor can transmit a light on objects and the reflected light is captured on the sensor and the phase shift between illuminated and reflected sine waves are used to determine the depth value of each pixel in the sensor. The reflected light is sampled at four different phases (with respect to the illuminating signal) to measure the phase shift. The phase shift (q) and depth (d) are calculated according to the following equations (A0, A1, A2, and A3 are integrated pixel data for the phase-sampling point at 0°, 90°, 180°, and 270°, respectively). The RGB frames or images are co-located with the depth sensor and use traditional methods of capturing color frames to guide depth completion.

Figure 3:
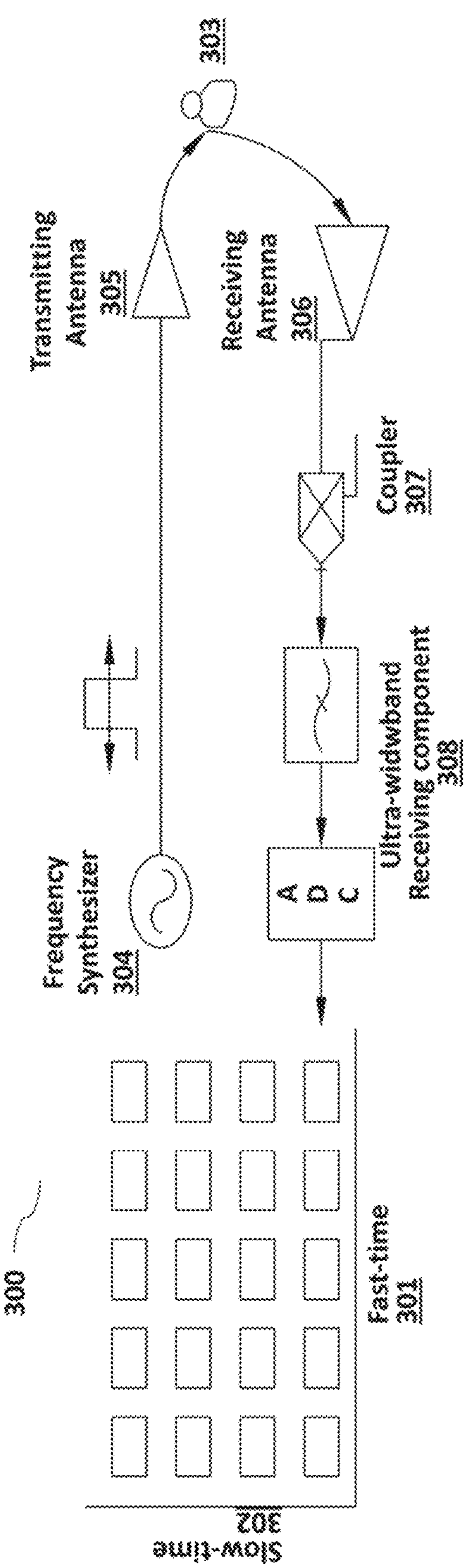
FIG. 3 is a schematic diagram of ultra-wideband (UWB) radar data acquisition according to the related art.

FIG. 3 is a schematic diagram of UWB radar data acquisition according to the related art. The UWB radar data acquisition involves the collection of information using ultra-wideband radar systems. The UWB radar operates by emitting short pulses of electromagnetic waves across a broad spectrum of frequencies. The waves interact with objects or surfaces in the environment, and the radar system collects the reflected signals or echoes. A fast time 301 in the UWB radar data refers to the dimension along which the radar samples the received signals concerning time. The fast time 301 represents the high-resolution temporal information captured within each pulse or chirp of the UWB radar system. The radar samples receive signals at a high rate, capturing the details of the echoes reflected from targets at different distances with high temporal resolution. Fast time 301 processing involves handling the time-domain data within each pulse or across multiple pulses. The slow time 302, on the other hand, represents the dimension across multiple radar pulses or chirps. The slow time 302 refers to the processing or aggregation of data over a more extended period, typically involving multiple radar sweeps or acquisitions. The slow time 302 processing deals with combining and analyzing data collected over a more extended duration, which can provide information about changes over time, object movements, or environmental variations.

The UWB radar system 300 generates short pulses using frequency synthesizer 304 of electromagnetic waves spanning a wide frequency range. The pulses are transmitted into the environment or scene 303 being monitored using transmitting antenna 305. When the waves encounter objects or surfaces 303, they reflect off them, producing echoes or reflections. The reflected waves are collected at a receiving antenna 306. The radar system 300 receives the reflected signals, capturing the amplitude, phase, and time delay information from an ultra-wideband receiving component 308. The received signals are processed to extract relevant information such as distance, position, velocity, or characteristics of the objects or surfaces. The processed information is stored or utilized for various applications such as target detection, localization, tracking, imaging, or environmental sensing. The collected UWB radar data undergoes significant signal processing and analysis to extract meaningful information relevant to the intended application.

Figure 4:
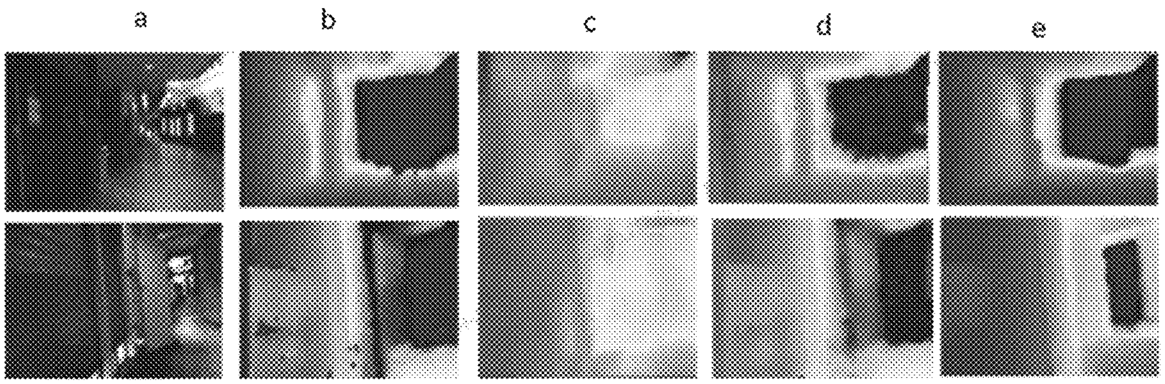
FIG. 4 is a representation of depth noise and variability in flood ToF from different venders, according to the related art.

FIG. 4 is a representation of depth noise and variability in flood ToF from different venders, according to the related art.

The distribution of depth samples for the LiDAR and dToF are similar for the use cases of the present disclosure. Furthermore, the sparsity patterns are also similar, therefore the present disclosure can easily adapt to depth samples from either sensor. Also, the depth samples from LiDAR are more accurate than from ToF sensors, thus using LiDAR improves the depth estimation performance.

The UWB sensors also produce depth maps similar to the ToF but operate at very high frequencies. This allows the sensors to aid in spatial mapping even when the subject is covered (a, b, c, d, e). Also, the UWB sensor produce depth variants in spot and full-field, and can seamlessly support both configurations with additional fine-tuning. The present disclosure quantifies the uncertainty in input depth and the unified ordinal vectors, can be completely sensor agnostic and can easily generalise to different sensors and ambient conditions.

Figure 5:
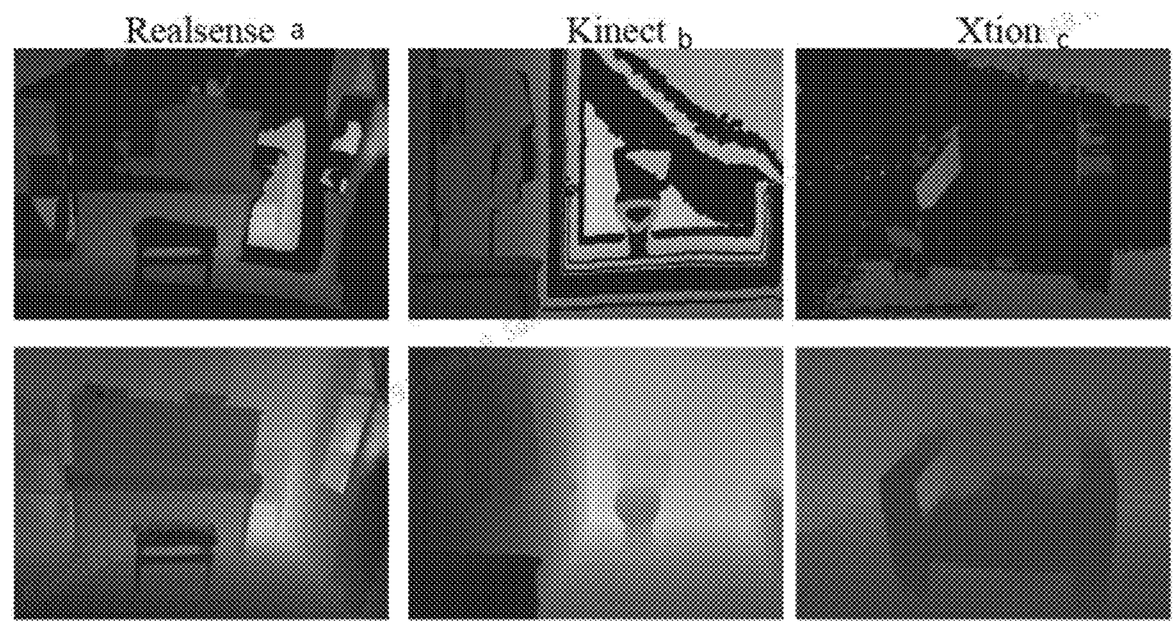
FIG. 5 is a representation of depth map and corresponding regions where the depth map pixel values are missing or uncertain, according to the related art.

FIG. 5 is a representation of the depth map and regions where the depth map pixel values are missing or uncertain, according to the related art.

The depth map of the scene is an intermediate representation that helps in many vision understanding and reconstruction problems. The depth map completion is a problem of filling the unknown/missing depth pixels in a given depth map with an estimated or predicted values. While there are various types of sensors available to capture the depth maps, the existing method suggests different map completion solutions for different sensors, which is not an efficient way. The different sensors (a, b, c) can be Real sense sensor, Kinect sensor, and a Xtion sensor and the like. The sensors (a, b, c) do not efficiently determine the depth of the objects as shown.

Figure 6:
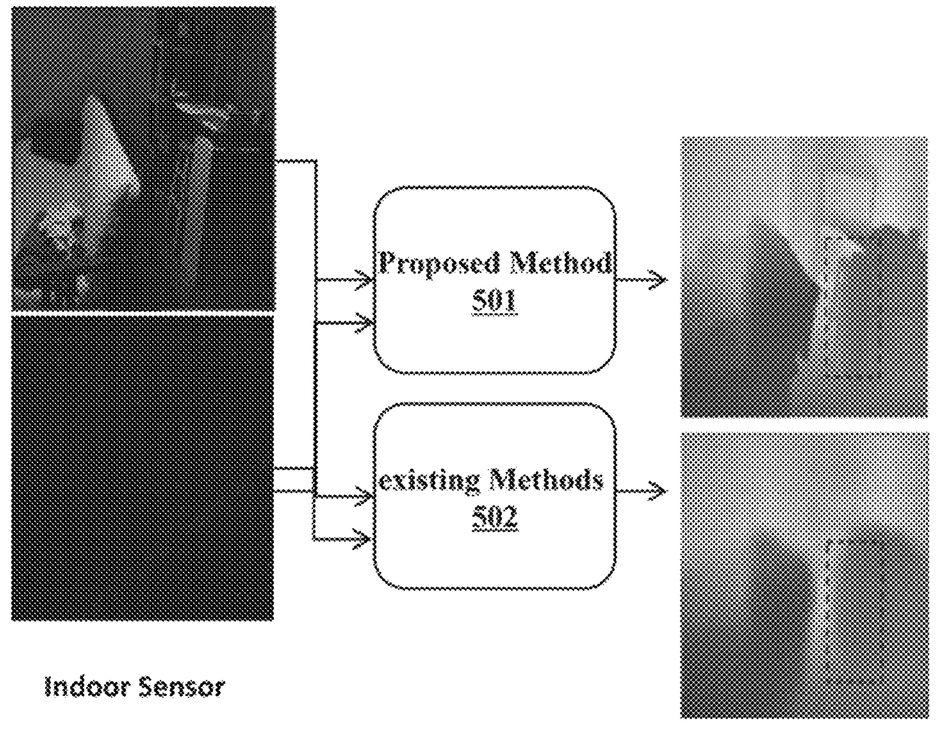
FIG. 6 is a flow diagram comparing depth completion device and existing methods, according to the related art and one or more embodiments.

FIG. 6 is a flow diagram comparing depth completion device and existing methods, according to the related art and one or more embodiments.

The current techniques 502 are inefficient in accurately determining the depth of objects that have a smaller illuminated area or in outdoor environments with limited visibility.

The present disclosure 501 provides a comprehensive solution that accommodates depth maps from various types of sensors. The method involves two-fold steps: a) Classification-based methods that select missing values from scene-based [semantic] categories, and b) Regression methods that estimate the missing pixel value by utilizing the surrounded known pixel values.

A depth value representation method, known as the Unified Ordinal Vector, is employed to obtain each missing depth pixel value through the classification of scene semantics (Coarse-level depth values). Subsequently, a regression method is applied to obtain the fine-grained actual depth value.

Furthermore, a training framework utilizing Neutrosophic sets is proposed to handle the uncertainty in depth maps.

The utilization of Unified Ordinal Vectors in the present disclosure offers several advantages, including: a) Enhanced depth completion capabilities, b) Effective handling of sensor intrinsic behaviors resulting in a unified solution, and c) Exceptional robustness when dealing with a diverse range of scenes.

Figure 7:
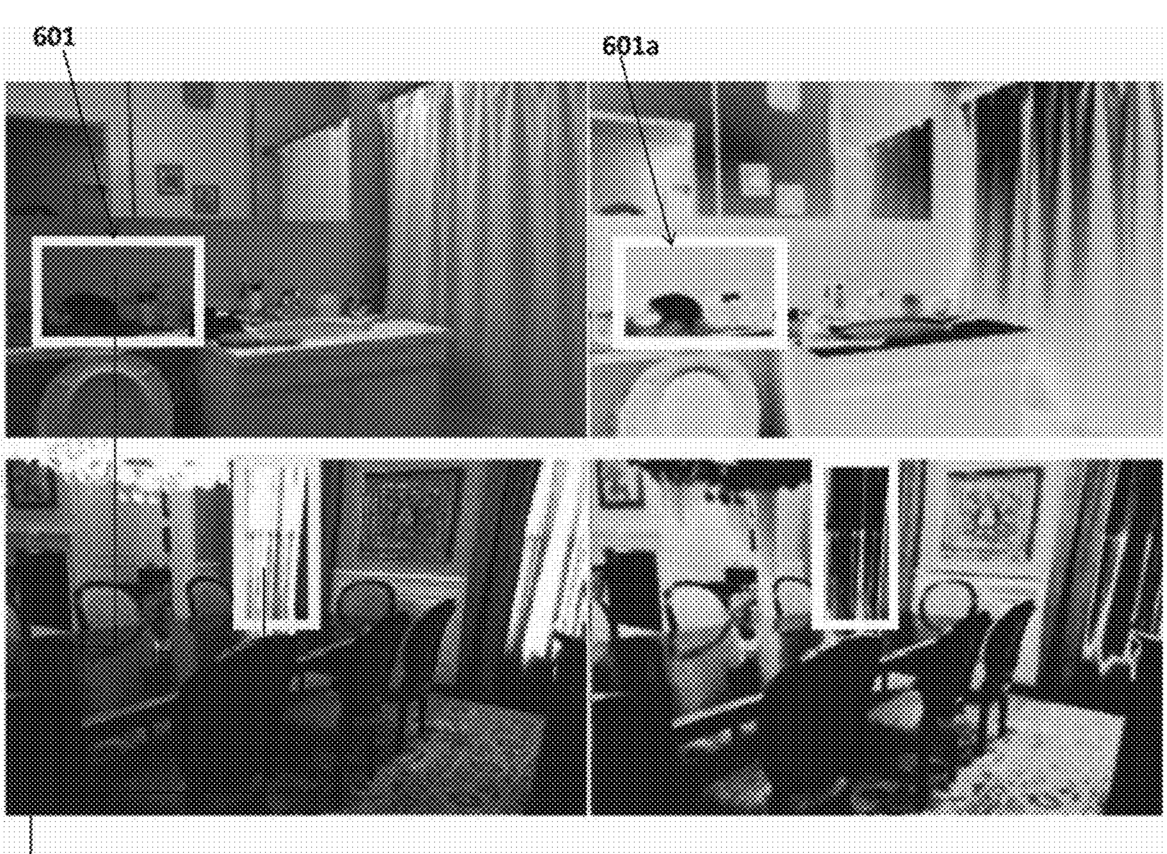
FIG. 7 is a visualization of scenes including RGB images and neutroTR attention map, according to the embodiment disclosed herein.

FIG. 7 is the visualization of scenes including RGB images and neutroTR 702 attention map, according to one or more embodiments.

In certain scenarios, areas with low or no lighting, reflective surfaces, and similar features are prone to unreliable or absent depth values 601. The accurate computation of depth pixels in these regions is critical for completing depth-related tasks. To address this issue, a Neutrosophic set is utilized to assign depth values as either 1 (True) or 0 (Uncertain), depending on the confidence level in the sensor's ability to provide accurate depth measurements. The depth completion training pipeline is designed to implicitly learn which regions of the depth map are most challenging to predict, assigning them a higher uncertainty score, while the rest of the regions are given a lower uncertainty value that tends towards 0.

Referring to the FIG. 6, the default depth values present for the highlighted regions 601 are not acceptable. The present disclosure's method ascribes greater uncertainty to regions such as those depicted in 601, while conferring lower uncertainty to other regions 601*a*. It should be noted that areas with low or no light, reflective surfaces, and the like, which are prone to unreliable or absent depth values, fall within the 601 category.

In an embodiment, a threshold is established by assessing the level of uncertainty inherent in the pixels. This threshold serves as a criterion for determining the depth value, which is calculated only for those pixels that exceed the threshold of the uncertainty score. The attention map is a natural byproduct of the uncertainty map, which assigns weights to every pixel in the image. This pixel weighting scheme enhances the overall depth completion performance, with a particular emphasis on regions that are poorly lit or contain reflective surfaces that can impede the quality of the completion process. Consequently, this innovative method prioritizes such regions, resulting in a superior completion quality.

$$G_{attn}(Q_I^C, K_G^U, V_G^U) = \text{softmax}\left(\frac{Q_I^C K_G^{U^T}}{\sqrt{d}} + B\right)V_G^U \tag{2}$$

The attention maps interpretation as visualised using a heat map is shown in the FIG. 6.

Figure 8A:
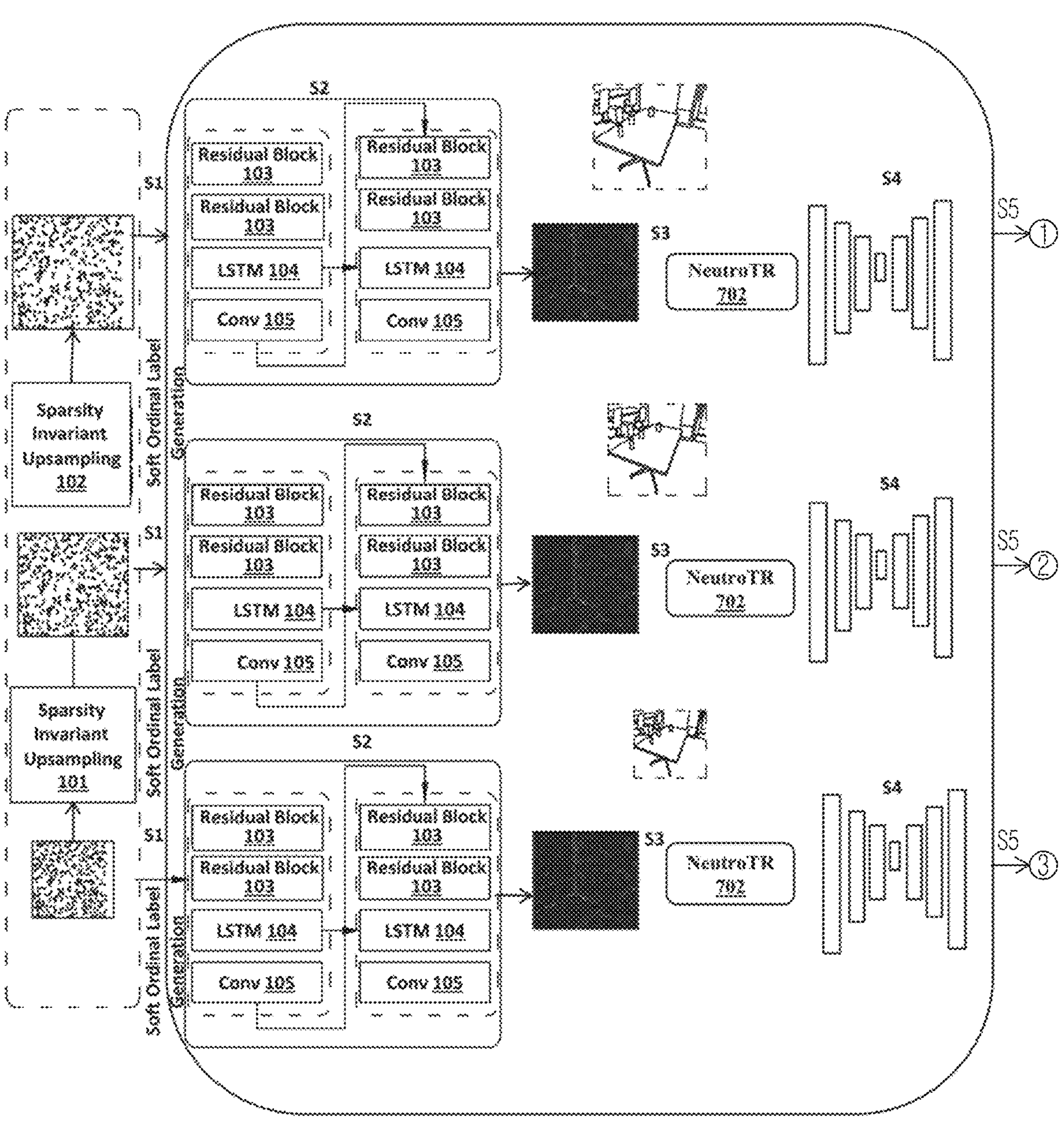
FIG. 8A is a schematic illustrating monocular depth estimation/completion from sparse sensors, according to one or more embodiments.
Figure 8B:
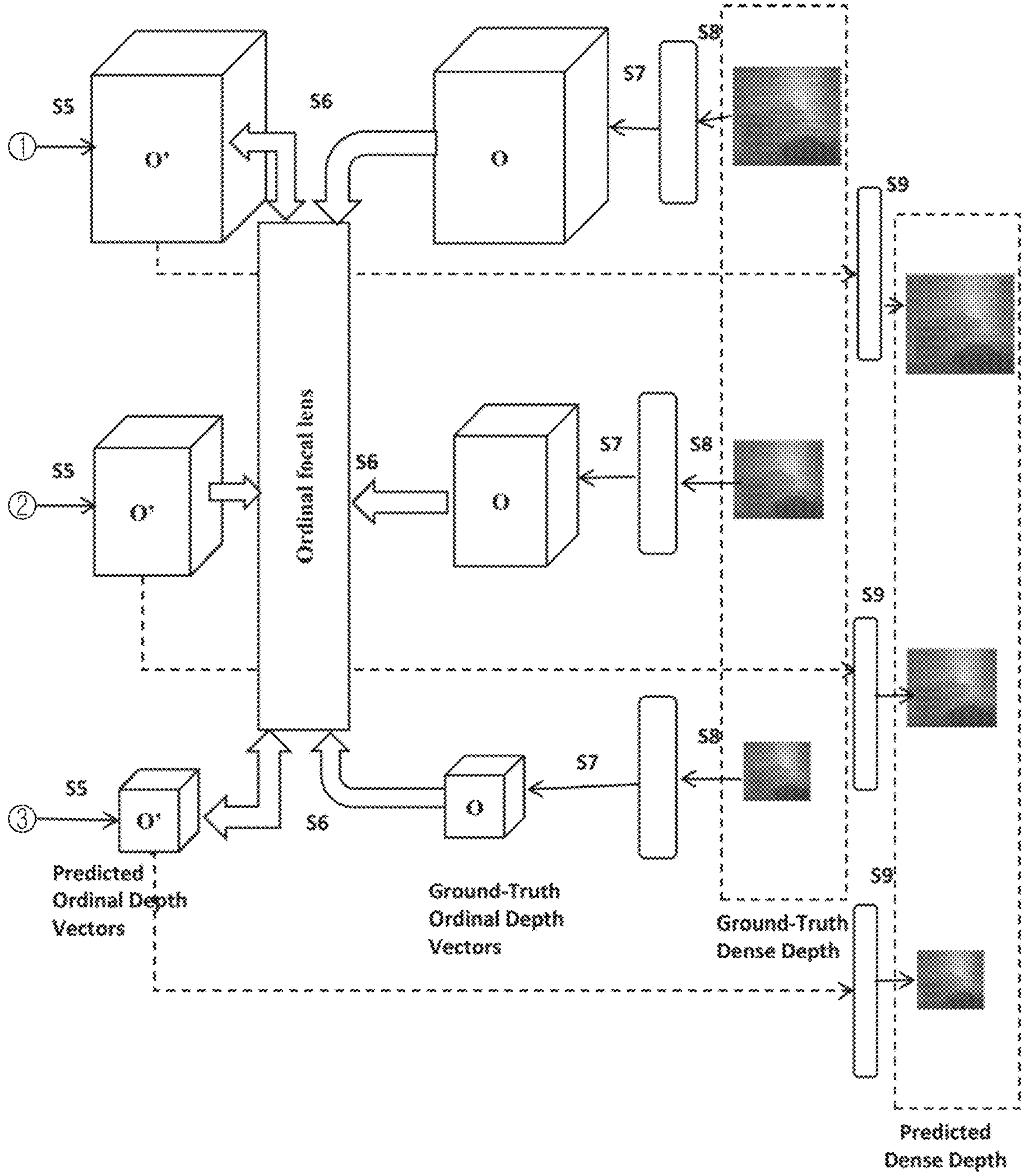
FIG. 8B is a schematic illustrating monocular depth estimation/completion from sparse sensors, according to one or more embodiments.

FIGS. 8A and 8B are schematic illustrating monocular depth estimation/completion from the sparse sensors, according to one or more embodiments.

The attention map serves to accentuate critical areas with inadequate depth values, prompting the model to amplify the learning loss in such regions. This approach enhances the model's focus on these areas, resulting in a gradual improvement in performance. For illustrative purposes, the number of levels is set at 3. The NTrans-Net comprises three components: uncertainty extraction, guided attention transformer encoder-decoder (NeutroTR) 702, and dense ordinal depth estimation. The predicted unified ordinal vectors undergo decoding to regress to the actual depth value.

At S1, a depth completion is modeled as a combined regression and classification problem using the UOVs. The UOV formulation is proposed to help achieve regression's accuracy and classification's completeness and generalizability. Given an input sparse depth map D 101, 102 at a particular scale to the network, Space Increasing Discretisation (SID) is used to generate the discrete label predictions on the ordinal scale. The motivation behind using ordinal labels is to maintain the ordering information inherent in the depth maps. Assuming a depth interval is discretized into K discrete ordinal labels Λ={r0, r2, . . . , rK−1}, each pixel in the depth map D∈R H×W is represented as a K-length UOV, {Oi∈R H×W} i=0 K−1 as shown in equation 1:

$$\{Oi\}_{i=0}^{K-1} = \begin{cases} 1 - e(-|D^{x,y} - r_i^{x,y}|), & \text{if } D^{x,y} \geq r_i^{x,y} \\ 0, & \text{otherwise} \end{cases} \tag{1}$$

The number of non-zero elements in the vector signifies the ordinal label/category and the non-zero value between (0, 1) denotes the absolute difference of the actual depth value from a particular discrete ordinal label. Thus, such a representation enables the network to first adopt classification to narrow the depth range of the final regression instead of regressing for the entire depth interval as done in regression methods.

The final depth maps predicted by the network are also in the form of UOVs. To regress the actual depth value for a particular pixel D x,y from the encoded UOV $$\{Oi\}_{i=0}^{K-1},$$

an optimal index [o] is identified in the vector as arg $$maxi \in \{0, \ldots, K-1\} O_i^{x,y},$$

from which the actual depth is regressed as, $$Dx, y = -\ln(1 - 0_o^{x,y}) + r_o^{x,y}.$$

At S2, in FIGS. 8A and 8B an overall pipeline is shown. For every incomplete depth map input to the network, the invariant downsampling is sparcified with a factor of 2 to obtain depth maps of different scales as input. Similarly, for the color images used for bi-linear downsampling. The NTrans-Net being a multi-scale network, takes the incomplete depth (after encoding each pixel as UOVs) and corresponding color image across scales and outputs a dense ordinal depth estimates for each scale input. The downsampling is performed up to four levels input in the network resulted in maximal performance gain. The Res-LSTM components 104 are used to extract an initial coarse uncertainty estimate from the sparse input. The specific organization of DUEM is highlighted in FIGS. 8A and 8B, in which, the input from each scale is processed by an LSTM component 104 after 5 residual blocks 103.

At S3, the Res-LSTM components 104 is used in the NTrans-Net to extract the uncertainty estimate. The motivation behind using LSTM is that it can quickly eliminate the redundancy in feature maps while reducing the negative effects caused by the disappearance of the gradient.

At S4, although the initial extracted uncertainty representation has important features that can guide the depth completion task, through experimentation, it is identified that exploiting the decomposed neutrosophic features to refine the uncertainty estimate for highlighting crucial regions like dark, reflective surfaces can further improve completion quality. The NS is made of three elements namely, Truth (T), False (F) and Indeterminacy (I). In the context of NS, uncertainty is expressed as indeterminacy. The NS feature extractor extracts and transforms each pixel in the image to the corresponding NS domain. The initial uncertainty map and the corresponding color image at each scale are decomposed into the T and I subsets only. Using the combined T and I feature sets; the pixels are represented organically with noisy depth or regions where depth is unpredictable as high indeterminacy data in a more detailed and refined manner as compared to the initial uncertainty map.

At S5, to thoroughly exploit the hierarchical and complementary information present in the color and depth neutrosophic feature maps, the dual branch transformer encoder-decoder structure (NeutroTR) 702 is employed. The two encoder branches have an identical structure. The truth and indeterminacy subsets each pass through a shallow feature extractor composed of 3×3 residual blocks with shared weights, which leads to more stable training and better performance. The resulting shallow features are then flattened and extract the key and value vectors from the truth subset and the query vector from the indeterminacy subset. Each encoder stage consists of self-attention blocks, feed-forward network and a down-sampling layer. After the encoding stage, the guided attention mechanism is considered to fuse features from the two encoders. The neutrosophic depth encoder is used as the guidance branch (G) and the neutrosophic color encoder as the input (I) to the guidance mechanism as shown in equation 2:

$$G_{attn}(Q_I^C, K_G^U, V_G^U) = \text{softmax}\left(\frac{Q_I^C K_G^{U^T}}{\sqrt{d}} + B\right) V_G^U \tag{2}$$

The decoder exhibits symmetry with the encoder, incorporating a scale guidance attention mechanism resembling equation 2. This mechanism facilitates the depth completion of the current scale, complemented by the upsampled NeutroTR 702 output of the preceding scale. This results in a feature representation that is both complementary and redundant.

At S6, S7 and S8, a deep convolutional encoder-decoder is employed to predict the dense depth for each scale (only full-scale depth prediction is taken as network output, other downsampled outputs are used only for multi-scale loss) using the features output from NeutroTR 702. The DODEM includes two strided convolutional blocks to downsample the feature map to get more sparse abstract features. Then, four dilated convolution layers with dilation rates of 2, 4, 8, 16 are used to increase the convolutional receptive field. Finally, two deconvolution layers are used to increase the size to the original resolution and the output is obtained by two convolution layers with sigmoid activation and channels equal to the number of ordinal labels. Skip connections are incorporated between the encoder and decoder to reduce information loss.

Figure 9:
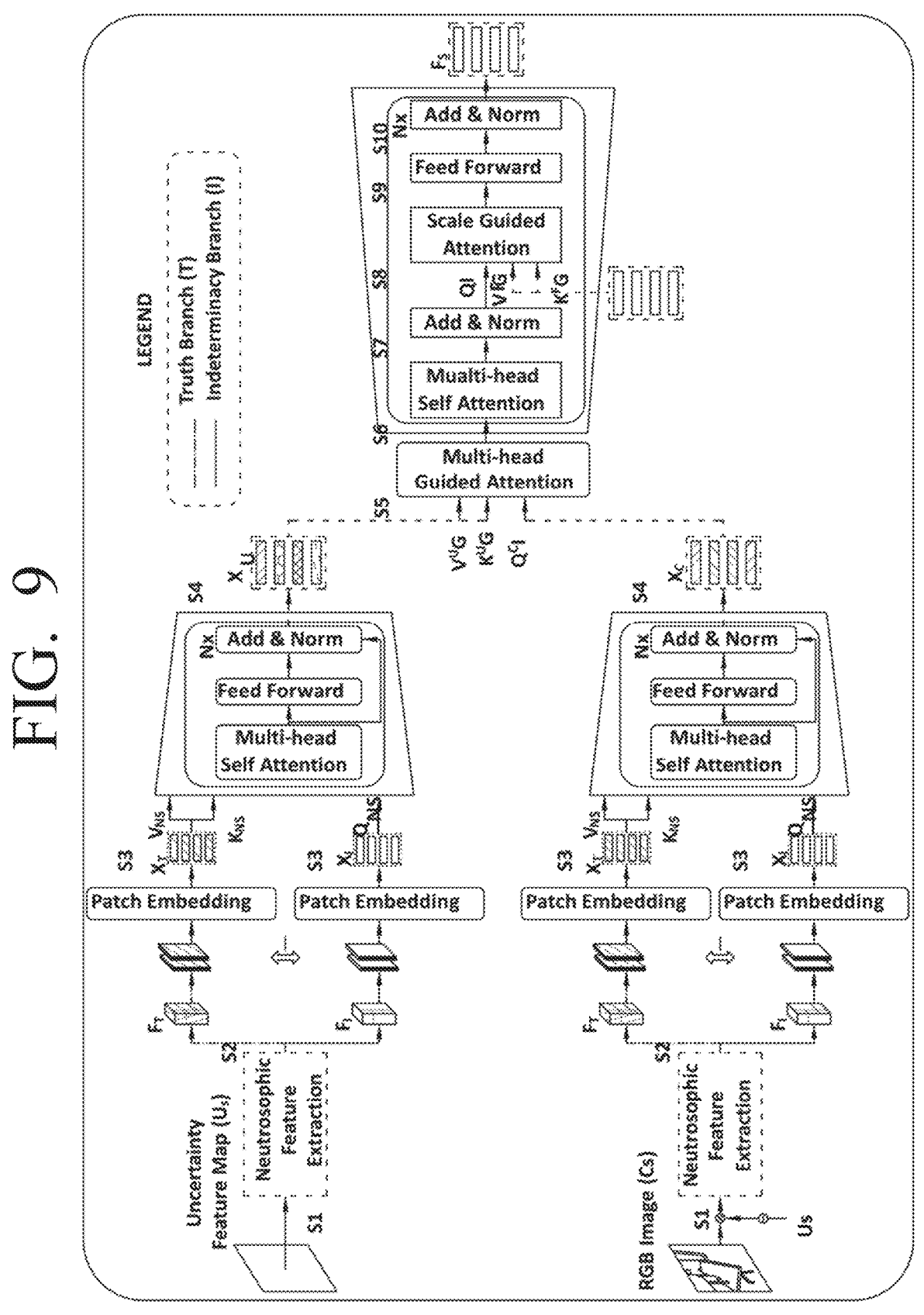

FIG. 9 is an architecture illustrating NeutroTR 702 transformer 106, according to one or more embodiments.

At S1, multiple branches are used for feature extraction from multimodal data. For example, color and sparse depth, researchers have also begun to integrate surface normal, affinity matrix, residual depth map, adversarial regularization and the like, into the frameworks to further push the envelope of depth completion.

At S2-S4, the depth completion as a combined regression and classification problem using UOVs are modeled. Given the input sparse depth map D at a particular scale to the network, the SID is used to generate the discrete label predictions on the ordinal scale. The motivation behind using ordinal labels is to maintain the ordering information inherent in depth maps. Assuming a depth interval is discretized into K discrete ordinal labels Λ={r0, r2, . . . , rK−1}, each pixel in the depth map D∈RH×W is represented as a K-length UOV, {Oi∈RH×W}. The number of non-zero elements in the vector signifies the ordinal label/category and the non-zero value between (0, 1) denotes the absolute difference of the actual depth value from a particular discrete ordinal label.

Technique 1: Ordinal Encoding:

Input: Ground-truth depth $D_{gt} \in R^{H \times W}$, K ordinal categories produced by SID $\Lambda = \{r_0, r_2, \ldots, r_{K-1}\}$ Output: Ground-truth ordinal vectors $\{O_i \in R^{H \times W}\}_{i=1}^{K}$ For (x, y) = (0, 0) to (H, W) do
  For i = 0 to K − 1 do If $D^{x,y} \geq r_i^{x,y}$ then -continued $O_i \leftarrow 1 - \exp\{-|D^{x,y} - r_i^{x,y}|\}$;

end
else
$|O_i \leftarrow 0$;
end
end
end return $\{\{O_i\}_{i=1}^{K}$;

Technique 2: Ordinal Encoding:

Input: Predicted ordinal vectors $\{O_i \in R^{H \times W}\}_{i=1}^{K}$, $K$ ordinal categories produced by SID $\wedge = \{r_0, r_2, \ldots, r_{K-1}\}$
Output: Regressed Depth $D \in R^{H \times W}$
for (x, y) = (0, 0) to (H, W) do
//select optimal index $o \leftarrow \arg\max_{i \in A} O_i^{x,y}$ // Regress depth value $D^{x,y} \leftarrow -\text{In}(1 - Oo) + r_o^{x,y}$;

end
return D;

At S5, to thoroughly exploit the hierarchical and complementary information present in the color and depth neutrosophic feature maps, the dual branch transformer encoder-decoder structure (NeutroTR) 702 is employed. The two encoder branches have an identical structure. The truth and indeterminacy subsets each pass through a shallow feature extractor composed of 3×3 residual blocks with shared weights, which leads to more stable training and better performance. The resulting shallow features are then flattened and the key and value vectors are extracted from the truth subset and the query vector from the indeterminacy subset. Each encoder stage consists of self-attention blocks, feed-forward network and a down-sampling layer. After the encoding stage, the guided attention mechanism is used to fuse features from the two encoders.

At S5-S10, the decoder is symmetric to the encoder with the addition of a scale guidance attention similar to equation 2, to guide the depth completion of the current scale with the upsampled NeutroTR 702 output of the previous scale for complementary and redundant feature representation. The deep convolutional encoder-decoder is employed to predict the dense depth for each scale (only full-scale depth prediction is taken as the network output, other downsampled outputs are used only for multi-scale loss) using the features output from the NeutroTR 702. The DODEM includes convolutional blocks to downsample the feature map to get more sparse abstract features. The two deconvolution layers are used to increase the size to the original resolution and the output is obtained by two convolution layers with sigmoid activation and channels equal to the number of ordinal labels. The skip connections are incorporated between the encoder and decoder to reduce information loss.

Figure 10:
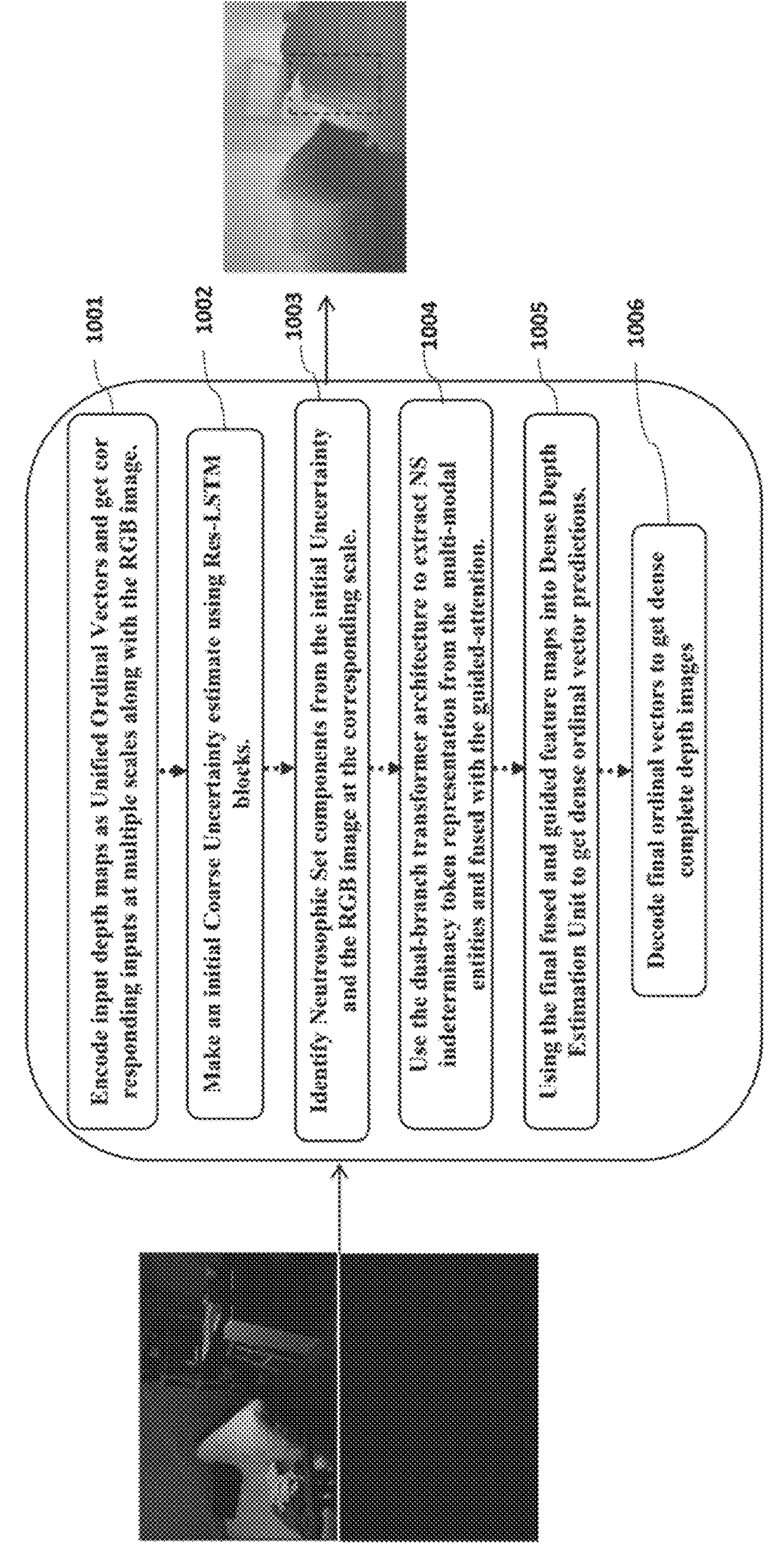
FIG. 10 is a flow diagram for determining depth information in media frames, according to one or more embodiments.

FIG. 10 is a flow diagram for determining depth information in media frames, according to one or more embodiments.

At 1001, the input depth maps are encoded as UOV and corresponding inputs at multiple scales are obtained along with the RGB images.

At 1002, an initial coarse uncertainty is estimated using the Res-LSTM component. At 1003, Neurosophic set components are identified from the initial uncertainty and the RGB images at the corresponding scale. At 1004, the NS indeterminacy token representation is extracted by utilizing the dual-branch transformer architecture from the multimodal entities and fused with the guided-attention. Using the final fused and guided feature maps, at 1005 employs the dense depth estimation component to obtain dense ordinal vector predictions. Further, at 1006, the final ordinal vectors are decoded to obtain dense complete depth images.

The network employs sparsity invariant downsampling with a factor of 2 to obtain depth maps of varying scales for every incomplete input depth map. Similarly, bilinear downsampling is utilized for color images. As a multi-scale network, the method according to one or more embodiments encodes each pixel as UOVs and takes incomplete depth and corresponding color image across scales to produce dense ordinal depth estimates for each input scale. The network identifies up to four levels of downsampled input, resulting in maximal performance gain.

In order to extract an initial coarse uncertainty estimate from the sparse input, the Res-LSTM components are used. The specific organization of DUEM is highlighted in the FIGS. 8A and 8B, in which, the input from each scale is processed by the LSTM component after the 5 residual blocks. The 4 Res-LSTM components are used to extract the uncertainty estimate.

The NS is made of three elements namely, Truth (T), False (F) and Indeterminacy (I). In the context of NS, uncertainty is expressed as indeterminacy. The initial uncertainty map and the corresponding color image at each scale are decomposed into the T and I subsets only. Since the F subset has redundant information, this is not utilized in the present method.

Using the combined T and I feature set organically represent pixels with the noisy depth or regions where depth is unpredictable as high indeterminacy data in a more detailed and refined manner as compared to the initial uncertainty map.

To thoroughly exploit the hierarchical and complementary information in the color and depth neutrosophic feature maps, the dual branch transformer encoder-decoder structure (NeutroTR) 106, 107 is employed. Each encoder stage consists of self-attention blocks, feed-forward network and the down-sampling layer. The decoder is symmetric to the encoder with the addition of the scale guidance attention similar. With the development of the VST, the operational range of the user is unlimited, therefore, the electronic device 1300 can be incorporated with multiple sensors to enable smooth transitions from one condition to other.

However, using the multiple sensors in the existing method setting require multiple models, increased development time, complicated sensor fusion and the like. With the method's uncertainty quantification and sensor agnostic performance.

When the user is in the semi-indoor setting at the balcony for example, the user can capture frames for depth completion consisting of indoor and outdoor frames, for which the electronic device 1300 has to toggle between the different sensors, but toggling between multiple models is not a feasible option. Using the method according to one or more embodiments, multiple sensors are used in a toggling mode, and the model can seamlessly estimate depth due to the proposed framework for robust spatial understanding tasks.

FIG. 11 is a flow diagram for illustrating Neutrosophic framework flow, according to one or more embodiments.

At 1101, input feature map is received as input.

At 1102, the input feature map is converted to grayscale using the existing methods.

At 1103, the spectral features are extracted from the input feature map. The spectral features are converted to LUV domain.

At 1104, the grayscale input features are converted to wavelet decomposition.

At 1105*a*, 1105*b*, 1105*c* includes LH sub-band, HL sub-band, and HH sub-band.

At 1106*a*, 1106*b*, 1106*c* includes L channel, U channel and V channel. The spectral features and the textural features are combined to transform into Neutrosophic domain by performing Neutrosophic enhancement.

Figure 12A:
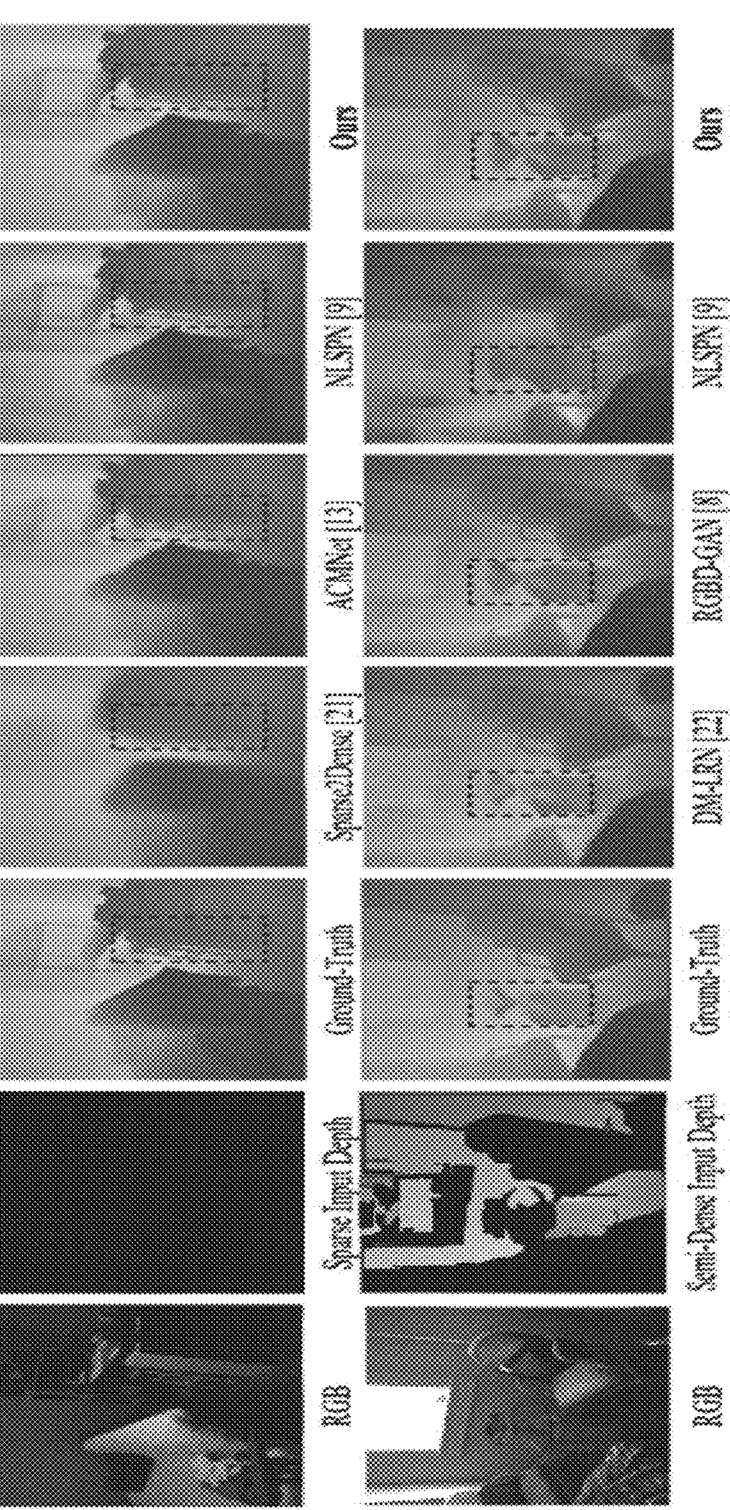
FIG. 12A is a visual representation of depth estimation primary results for different sensors and different sensor configurations, according to one or more embodiments.

FIG. 12A is a visual representation of depth estimation primary results for different sensors and different sensor configurations, according to one or more embodiments.

Figure 12B:
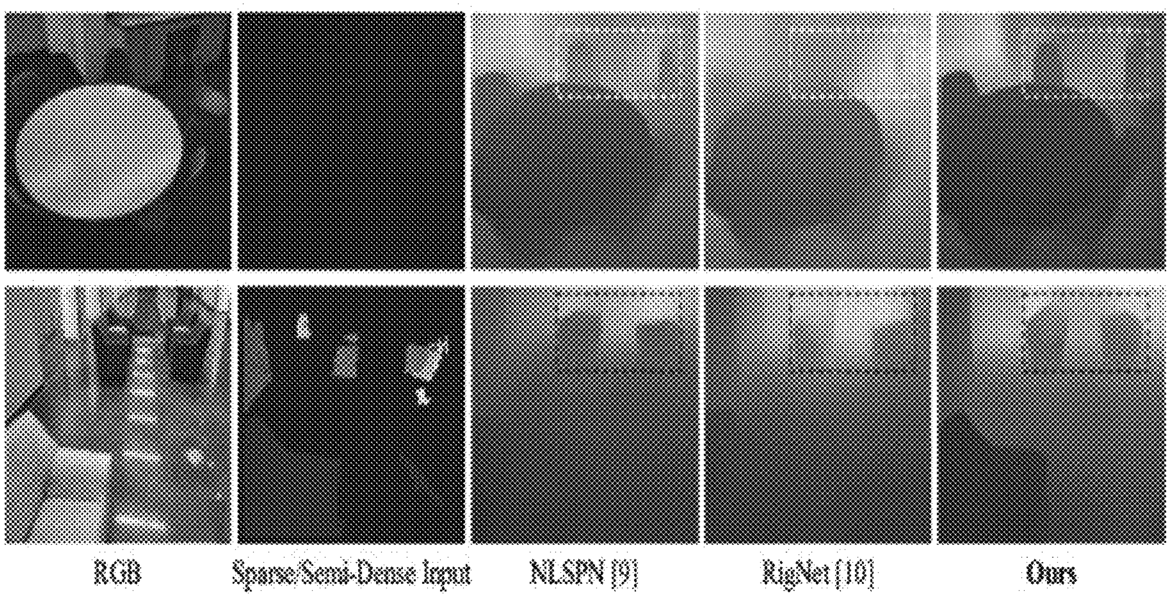
FIG. 12B is a visual representation of second depth estimation primary results for different sensors and different sensor configurations, according to one or more embodiments.

FIG. 12B is a visual representation of second depth estimation primary results for different sensors and different sensor configurations, according to one or more embodiments.

Figure 13:
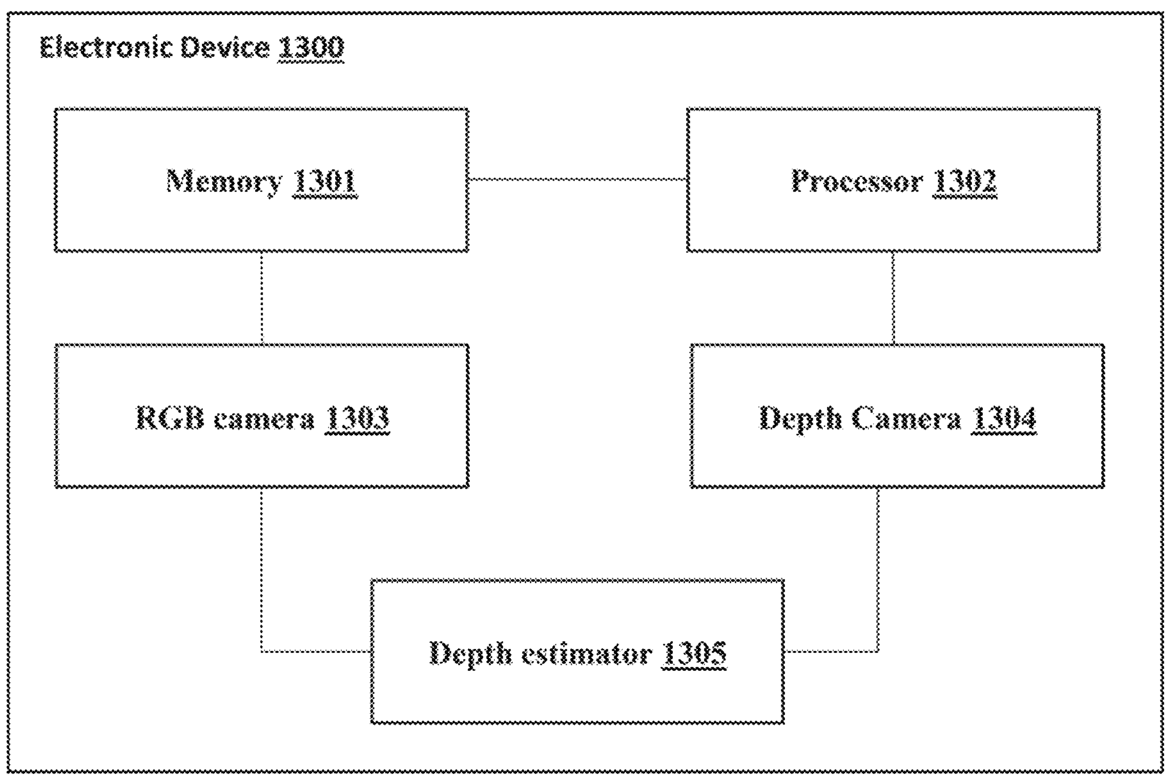
FIG. 13 is a block diagram illustrates determining depth information in media frames, according to one or more embodiments.

FIG. 13 is a block diagram illustrating electronic device 1300 determining depth information in media frames, according to one or more embodiments.

The electronic device 1300 includes a memory 1301, a processor 1302, an RGB camera 1303, a depth camera 1304, and a depth estimator 1305. The RGB camera 1303 can be one RGB camera or a plurality of RGB cameras.

The memory 1301 is configured to store instructions to be executed by the processor 1302. The memory 1301 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1301 may, in some examples, be considered a non-transitory storage medium. The term "non-transitory" may indicate that the storage medium is not embodied in a carrier wave or a propagated signal. However, the term "non-transitory" should not be interpreted that the memory 1301 is non-movable. In some examples, the memory 1301 is configured to store larger amounts of information. In certain examples, a non-transitory storage medium may store data that can, over time, change (e.g., in Random Access Memory (RAM) or cache).

The processor 1302 may include one processor or a plurality of processors. The one or the plurality of processors 1302 may be a general-purpose processor, such as a central processing unit (CPU), an application processor (AP), or the like, a graphics-only processing unit such as a graphics processing unit (GPU), a visual processing unit (VPU), and/or an AI-dedicated processor 1202 such as a neural processing unit (NPU). The processor 1302 may include multiple cores and is configured to execute the instructions stored in the memory 1301.

The RGB camera 1303 can be used in any electronic devices 1300 such as mobile phones, laptops, VR devices and the like. The RGB camera 1303 is used for positional tracking, environment understanding, hand tracking, and augmented reality (AR) applications. The cameras are used to capture the real-world environment and enable the electronic device 1300 to interpret and interact with the user's surroundings. The RGB camera 1303 captures color information and create a digital representation of the physical environment.

The depth camera 1304 also known as depth-sensing cameras or depth perception cameras, are devices that can perceive and capture depth information in addition to the traditional RGB color information. The cameras measure the distance between the camera and various points in the scene, creating a three-dimensional representation of the environment. The depth cameras 1304 use various technologies to determine distances to objects or surfaces. The technologies can be ToF sensors, structured light, and stereo vision. The depth cameras 1304 are extensively used in applications such as three-dimensional scanning and modeling, gesture and motion control, AR device, and object recognition and scene understanding.

The depth estimator 1305 may be implemented by the processor 1302 and determines the depth information of the objects in the scene. The depth estimation is performed by generating the RGB images having a first high pixel density images using the RGB camera 1303. The depth images are generated having a second pixel density (referred as sparse depth input) lower than the first high pixel density using the depth camera 1304. The uncertainty score is determined for each pixel in the sparse depth input in the merged RGB images and the depth image. A threshold is determined for the uncertainty score based on level of uncertainty in the pixel of the sparse depth input to apply the depth value in the merged image. The scene with the depth value information is generated based on the determined depth value.

Ability to generalize and estimate/complete depth maps captured by a variety of different sensors in face of extreme variability in noise and data patterns, owing to the uncertainty quantification and Neutrosophic set guided attention. The deep model that works simultaneously for indoor/outdoor environments by leveraging different types of sensors. The depth estimation results with different sparsity patterns and sample count as low as 5% (for example) of the complete spatial resolution of the image. Ability to support a future VR/MR head mounted device that requires only 1/100th the power (because of spot depth sensors) and have a range of 1-80 m (indoor and outdoor) for seamless 3D scene understanding anywhere and under any ambient condition.

Embodiments of the disclosure utilize RGB image input for the purpose of predicting depth data in cases where the original depth data obtained is inadequate and provide significant technical value in enabling low power operation of Time-of-Flight (ToF) technology.

The present disclosure offers a solution for monocular depth estimation/completion from sparse sensors. For instance, with the VST's operational range being boundless, the device may require multiple sensors to facilitate smooth transitions from one condition to another. However, employing multiple sensors in a conventional setting would necessitate multiple models, extended development time, and complicated sensor fusion. With the disclosure's uncertainty quantification and sensor-agnostic performance, a single model can serve as an all-in-one solution.

For example, if the user is in a semi-indoor setting, such as a balcony, they may capture frames for depth completion that consist of both indoor and outdoor frames. Toggling between different sensors is a challenge, but using the proposed method, multiple sensors can operate in a toggling mode, and the model can effortlessly estimate depth due to the proposed framework for robust spatial understanding tasks.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

What is claimed is:

1. A method for determining depth information of objects in a scene, the method comprising:

generating RGB images having a first pixel density using an RGB camera;

generating a depth image having a second pixel density using a depth camera, the second pixel density being lower than the first pixel density;

generating an attention map using the RGB images with a high pixel density;

merging the RGB images and the depth image to generate a merged image;

determining an uncertainty score of each pixel of a plurality of pixels in the merged image;

determining a threshold for the uncertainty score based on a level of uncertainty in the plurality of pixels;

determining a depth value for each pixel of the plurality of pixels exceeding the threshold of the uncertainty score;

applying the depth value of each pixel of the plurality of pixels in the merged image; and generating the scene with the depth information based on the depth value.

2. The method of claim 1, wherein the attention map comprises semantically related pixels of the RGB images.

3. The method of claim 1, wherein the generating the depth image comprises:

illuminating the scene with a modulated light source using the RGB camera;

capturing a reflected light on a sensor associated with the depth camera at different phases with respect to the illuminated scene;

determining a phase shift between the illuminated scene and the reflected light at the different phases; and collocating the illuminated scene with the reflected light on the sensor to generate the depth Image.

4. The method of claim 1, wherein the determining the threshold for the uncertainty score comprises:

determining each pixel value of the RGB images based on uncertainty;

assigning weights to each pixel of the plurality of pixels based on the level of the uncertainty; and determining the level of the uncertainty in the plurality of pixels based on the assigned weights.

5. The method of claim 1, wherein the generating the attention map comprises determining a region of interest having poor depth values.

6. The method of claim 1, wherein the determining the depth value for each pixel exceeding the threshold of the uncertainty score comprises:

determining a unified ordinal vector (UOV) to each pixel of the scene, wherein the UOV identifies missing depth pixel value through classification scene semantics; and applying a regression method on the determined UOV to determine the depth value.

7. The method of claim 1, wherein the determining the uncertainty score of each pixel of the plurality of pixels is based on Neutrosophic sets.

8. An electronic device for determining depth information of objects in a scene, the electronic device comprising:

a memory storing instructions;

an RGB camera;

a depth camera;

at least one processor operatively coupled with the memory, the RGB camera and the depth camera, wherein the least one processor is configured to execute the instructions to:

generate RGB images having a first pixel density using the RGB camera;

generate a depth image having a second pixel density using the depth camera, the second pixel density being lower than the first pixel density;

generate an attention map using the RGB images with a high pixel density;

merge the RGB images and the depth image to generate a merged image;

determine an uncertainty score of each pixel of a plurality of pixels in the merged image;

determine a threshold for the uncertainty score based on a level of uncertainty in the plurality of pixels;

determine a depth value for each pixel of the plurality of pixels exceeding the threshold of the uncertainty score;

apply the depth value for each pixel of the plurality of pixels in the merged image; and generate the scene with the depth information based on the depth value.

9. The electronic device of claim 8, wherein the attention map comprises semantically related pixels of the RGB images.

10. The electronic device of claim 8, wherein the at least one processor is further configured to execute the instructions to generate the depth image having the second pixel density by:

illuminating the scene with a modulated light source using the RGB camera;

capturing a reflected light on a sensor associated with the depth camera at different phases with respect to the illuminated scene;

determining a phase shift between the illuminated scene and the reflected light at the different phases; and collocate the illuminated scene with the reflected light on the sensor to generate the depth image.

11. The electronic device of claim 8, wherein the at least one processor is further configured to execute the instructions to determine the threshold for the uncertainty score by:

determining each pixel value of the RGB images based on uncertainty;

assigning weights to each pixel of the plurality of pixels based on the level of the uncertainty; and determining the level of the uncertainty in the plurality of pixels based on the assigned weights.

12. The electronic device of claim 8, wherein the at least one processor is further configured to execute the instructions to generate the attention map by determining a region of interest having poor depth values.

13. The electronic device of claim 8, wherein the at least one processor is further configured to execute the instructions to determine the depth value for each pixel of the plurality of pixels exceeding the threshold of the uncertainty score by:

determining a unified ordinal vector (UOV) to each pixels of the scene, wherein the UOV identifies missing depth pixel value through classification scene semantics; and applying a regression method on the determined UOV to determine the depth value.

14. The electronic device of claim 8, wherein the at least one processor is further configured to execute the instructions to determine the uncertainty score of each pixel of the plurality of pixels based on a Neutrosophic sets.

* * * * *